Patented June 1, 1954

2,680,096

UNITED STATES PATENT OFFICE 2,680,096

PROCESS FOR PREPARING SULFURIZED POLYVALENT METAL PHENATES

James H. Walker and Noel P. Shiells, Richmond, Calif., assignors to California Research Corporation, San Francisco, Calif., a corporation of Delaware No Drawing. Application February 12, 1951, Serial No. 210,622

6 Claims. (Cl. 252—42.7)

This invention pertains to a new method of manufacturing calcium phenates containing sulfur; that is, sulfurized calcium phenates.

Sulfurized calcium alkyl phenates are used as compounding agents in lubricating oils to inhibit corrosion, piston ring sticking and gum formation in internal combustion engines resulting from oxidation of the lubricating oil and polymerization of the engine fuel residues.

"Normal" and "basic" sulfurized calcium phenates are excellent lubricating oil additives. Numerous attempts have been made in recent years to prepare oil-soluble sulfurized calcium phenates having the detergent characteristics of the phenates, and, in addition, the property of neutralizing larger amounts of acidic bodies than possible heretofore with the presently-available normal sulfurized calcium alkyl phenates. The sulfurized calcium alkyl phenates which are disclosed herein as having greater neutralizing properties than those heretofore available will hereinafter be known as "basic sulfurized calcium phenates."

As used herein, normal sulfurized calcium phenates refer to sulfurized calcium phenates wherein the ratio of calcium to the phenol nucleus is about 1:2, such as

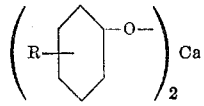

wherein R represents alkyl substituent radicals on a benzene ring.

As used herein, the term "basic sulfurized calcium phenates" refers to sulfurized calcium phenates wherein the ratio of calcium metal to phenol is greater that that of the normal sulfurized calcium phenates.

It is a particular advantage of this invention that "basic" sulfurized calcium phenates (e. g., basic sulfurized calcium hexadecyl phenate) having metal contents up to and greater than 100% in excess of the metal present in the corresponding sulfurized normal calcium phenates can be prepared. Heretofore, the attempted preparation of basic sulfurized calcium phenates has resulted in the formation of a gel-like substance not filterable.

Basic sulfurized metal phenates are particularly useful when incorporated in lubricating oil compositions for diesel engines.

Numerous difficulties which have been encountered heretofore in the preparation of sulfurized calcium alkyl phenates include (1) the difficulty of filtering the reaction mixture to remove the unreacted calcium oxide or hydroxide, (2) the necessity of using a two-step process, etc. According to the process of the present invention, these difficulties and others are overcome; for example, less time is consumed in the preparation of sulfurized calcium alkyl phenates.

It is a primary object of this invention to set forth a method of preparing sulfurized calcium phenates.

It is an object of this invention to provide a method of producing basic sulfurized calcium phenates having metal contents up to and greater than 100% in excess of that present in the corresponding sulfurized normal calcium phenates.

These and other objects of this invention will be apparent from the ensuing description and the appended claims.

It has been discovered that oil-soluble sulfurized calcium phenates, that is, oil-soluble normal sulfurized calcium phenates and basic sulfurized calcium phenates, can be prepared by the reaction of phenols with calcium oxides or hydroxides in the presence of glycols and sulfur.

As used herein, the term "phenol" means phenol and derivatives of phenol; similarly, the term "calcium phenate" means the calcium salt of phenol and derivatives of phenol.

The calcium phenates which are to be reacted with sulfur to form the sulfurized calcium phenate are of the formula:

$$[(R)_aAO]_2Ca$$

wherein A is an "essentially hydrocarbon" aromatic radical, preferably a benzene radical, R is a cyclic, straight-chained or branched-chained, saturated or unsaturated, essentially hydrocarbon radical having from 4 to 30 carbon atoms, O represents oxygen, $a$ is a number having a value of 1 to 5.

By "essentially hydrocarbon" (i. e., hydrocarbonaceous) radical is meant those radicals which are composed mainly of hydrogen and carbon, and include such radicals which contain, in addition, minor amounts of substituents, such as chlorine, bromine, oxygen, sulfur, nitrogen, etc., which do not substantially affect their hydrocarbon character.

Examples of suitable hydrocarbonaceous radicals include alkyl radicals such as butyl, hexyl, octyl, decyl, dodecyl, hexadecyl, eicosyl, triacontyl radicals; radicals derived from petroleum hydrocarbons, such as white oil, wax, olefin polymers (e. g., polypropylene and polybutylene), etc.; aryl radicals such as phenyl, naphthyl, etc.;

aralkyl radicals such as phenyloctyl, phenyldecyl, phenyloctadecyl, etc.; alkaryl radicals such as amylphenyl, cetylphenyl, etc.; and cyclic non-benzenoid radicals, such as cyclohexyl, bornyl, etc.

Examples of calcium phenates include the calcium salts of octyl phenol, decyl phenol, dodecyl phenol, tetradecyl phenol, hexadecyl phenol, triacontyl phenol, etc.

The glycols used as the solvent to prepare the sulfurized calcium phenates of this invention may contain up to 6 carbon atoms. Suitable glycols include: ethylene glycol, propylene glycol, butane diol-2,3; pentane diol-2,3; and 2-methyl butane diol-3,4. Because of the higher yield of product obtained, ethylene glycol is the preferred solvent.

The basic sulfurized calcium phenates may be prepared from normal calcium alkyl phenates or from phenols. When phenols are used as starting materials, the phenols are treated with calcium oxide or hydroxide to form the desired normal calcium phenates, which phenates are then treated further with calcium oxide or hydroxide and sulfur to form the sulfurized basic calcium phenate. On the other hand, the phenols may be treated with calcium oxides or hydroxides and sulfur in amounts sufficient to form the sulfurized basic calcium phenates directly without the initial formation and separation of the normal calcium phenates.

According to the process of this invention, in the preparation of "normal" or "basic" sulfurized calcium phenates, it is essential that elemental sulfur be present along with the calcium oxide or hydroxide. That is, in the preparation of a sulfurized normal calcium alkyl phenate, for example, it is essential that the alkyl phenol, calcium oxide or hydroxide, elemental sulfur and glycol be blended together for the reaction. Similarly, in the preparation of a sulfurized basic calcium alkyl phenate, for example, it is necessary to mix together the alkyl phenol, calcium oxide or hydroxide, elemental sulfur and glycol.

The amount of elemental sulfur present in the reaction mixture can vary from 10 mol per cent to 200 mol per cent (based on the calcium). It is preferred to use from 50 to 125 mol per cent (based on calcium).

As noted hereinabove, the amount of calcium oxide or hydroxide used is that amount which will be sufficient to give the basic sulfurized calcium phenate an amount of calcium up to and greater than 100% more calcium than that which is present in the normal calcium phenates. The amount of calcium oxides or hydroxides used in the reaction depends somewhat on the amount of calcium desired in the product in excess of that of the normal phenates, and, as noted hereinbelow, also depends on the weight ratio of glycol to calcium oxide or hydroxide used. Normally, in the preparation of a basic sulfurized calcium phenate, a slight excess (e. g., 10 mol per cent excess) of calcium oxide or hydroxide is used in the reaction over that desired in the final basic phenate product.

The amount of the glycol used will depend in part upon the nature of the glycol itself which is used, and, as noted above, on the amount of calcium oxide or hydroxide used. In general, the use of low molecular weight glycols (e. g., ethylene glycol) results in obtaining a higher yield of the basic phenate than does the use of higher molecular weight glycols (e. g., propylene glycol) when both are used in the same amounts by weight. The amount of glycol used is also governed by the solubility of the acidic substance (the phenols or the calcium phenates) and the calcium oxide and hydroxide in the glycol.

It is preferred in practicing this invention to select a glycol in which phenols, normal phenates and calcium oxides and hydroxides have the greatest solubility.

A sufficient amount of glycol is employed to bring the reactant into efficient contact for substantial reaction in a reasonably short time. That is, the amount of glycol used is sufficient to dissolve a portion of each of the reactants and to cause substantial contact between said reactants. For this purpose, it is beneficial to use certain ratios by weight of the glycol to the calcium oxide or hydroxide, which ratio may be from about 50 to 1 to about 1 to 1; 25 to 1 to about 2 to 1 being preferred.

The temperatures at which the reactants of this invention will react in the presence of glycols are dependent to a large extent on the nature of the acidic substance (i. e., the phenols or the neutral calcium phenates), the calcium oxide or hydroxide and the glycol.

Although the reaction may take place at atmospheric pressure, it is desirable that this process take place at reduced pressures. Thus, it is preferred to use the minimum temperatures at which the reaction will take place at reduced pressures, the reduced pressure and the temperature to be guided by the glycol used. It is preferred to use a pressure substantially less than atmospheric pressure; that is, it is preferred to use a reduced pressure in order that the glycol may be distilled off from the mixture at a temperature less than 400° F. Thus, the maximum temperature of the reaction may be about 400° F. with a minimum temperature of about 200° F.

In the reaction process set forth in this invention, it is preferred to incorporate lubricating oil in the mixture because the resulting lubricating oil solution is then readily usable as a base for the preparation of useful lubricating oil compositions. Also, the presence of the lubricating oil decreases the viscosity of the mixture and facilitates the handling of the reaction mixture.

Lubricating oils which may be used for this purpose include a wide variety of lubricating oils such as naphthenic base, paraffin base, and mixed base mineral oils, other hydrocarbon lubricants, e. g., lubricating oils derived from coal products and synthetic oils, e. g., alkylene polymers (such as polymers of propylene, butylene, etc., and mixtures thereof), alkylene oxide type polymers, dicarboxylic acid esters and liquid esters of acids of phosphorus. Synthetic oils of the alkylene oxide type polymer which may be used include those exemplified by alkylene oxide polymers (e. g., propylene oxide polymers) and derivatives, including alkylene oxide polymers prepared by polymerizing alkylene oxides (e. g., propylene oxide) in the presence of water or alcohols, e. g., ethyl alcohol, and esters of alkylene oxide type polymers, e. g., acetylated propylene oxide polymers prepared by acetylating the propylene oxide polymers containing hydroxyl groups.

The following examples, with the exception of Example I, illustrate the preparation of sulfurized calcium phenates according to the present invention. Example I illustrates the preparation of an alkyl phenol, Examples II to V, inclusive, illustrate the preparation of basic sulfurized calcium phenates, and Examples VI to VIII, inclusive, illustrate the preparation of normal sulfurized calcium phenate. The molecular weights of the alkyl phenols used in the following examples ranged from 285 to 300.

*Example I*

A mixture consisting of 300 parts by weight of phenol, 555 parts by weight of olefin polymers having average molecular weights of 170, and 45 parts by weight of acid-treated clay was heated at 300° F. for a period of 12 hours, after which time the mixture was filtered. The remaining reaction was heated to 530° F. to remove unreacted phenol, olefin polymers and low molecular weight phenols. The resulting product was used in the preparation of normal sulfurized calcium alkyl phenates and basic sulfurized calcium alkyl phenates.

*Example II*

A mixture of 600 parts by weight of an alkyl phenol having a boiling range of 560° F. to 700° F., 140 parts by weight of calcium hydroxide, 55 parts by weight of sulfur and 300 parts by weight of ethylene glycol was heated at 300° F. with agitation at an absolute pressure of 300 mm. of mercury. After the water of reaction had been distilled off, the pressure was reduced to 60 mm. of mercury and the temperature raised to 380° F., at which temperature and pressure the ethylene glycol was removed. During the period when the ethylene glycol was being removed, 400 parts by weight of petroleum lubricating oil were added. When all of the ethylene glycol had been removed, the mixture was cooled and 200 parts by weight of a petroleum thinner were added and the mixture was filtered. The filtrate was heated at reduced pressure to remove the petroleum thinner. The final lubricating oil composition contained 2.85% sulfur and 5.63% calcium; the basic sulfurized calcium alkyl phenate containing 92% more calcium than that present in the corresponding normal calcium alkyl phenate.

*Example III*

A mixture of 400 parts by weight of an alkyl phenol having a boiling range of 560° to 700° F. and 33 parts by weight of sulfur was heated to 200° F. To this mixture was added a slurry of 81 parts by weight of calcium hydroxide, 200 parts by weight of ethylene glycol and 200 parts by weight of a petroleum lubricating oil having a viscosity of 49.5 S. S. U. at 210° F. At an absolute pressure of 16 mm. of mercury, the mixture was heated to distill off the water of reaction and the ethylene glycol. During this time, an additional 200 parts by weight of petroleum lubricating oil was added. The whole mixture was heated to 380° F. at a pressure of 16 mm. of mercury in order to remove the ethylene glycol. After the product had been filtered, the reaction mixture contained 2.08% sulfur and 3.81% calcium. The basic sulfurized calcium alkyl phenate contained 50% more calcium than that present in the corresponding normal sulfurized calcium alkyl phenate.

*Example IV*

A mixture of 100 parts by weight of an alkyl phenol having a hydroxyl number of 150, 50 parts by weight of ethylene glycol, 20 parts by weight of calcium hydroxide, 8 parts by weight of elemental sulfur, and 200 parts by weight of a petroleum lubricating oil was heated for one hour at a temperature of 380° to 400° F. and an absolute pressure of 50 to 60 mm. of mercury. This reaction mixture was filtered hot. The resulting petroleum lubricating oil composition contained 1.43% sulfur and 2.67% calcium. The basic sulfurized calcium alkyl phenate contained 60% more metal than that present in the normal sulfurized calcium alkyl phenate.

*Example V*

A mixture of 100 parts by weight of an alkyl phenol having a hydroxyl number of 140, 50 parts by weight of ethylene glycol, 200 parts by weight of a petroleum lubricating oil, 20 parts by weight of calcium hydroxide and 8 parts by weight of sulfur was heated gradually under a reduced pressure (50 to 60 mm. of mercury—absolute pressure) to 380° F., at which temperature and pressure the reaction mixture was held for one hour with stirring. The reaction mixture was filtered at 380° F., and the reaction product contained 1.30% sulfur and 2.70% calcium. The basic sulfurized calcium alkyl phenate contained 75% more calcium than that present in the normal sulfurized calcium alkyl phenate.

*Example VI*

A mixture of 120 parts by weight of ethylene glycol, 19.3 parts by weight of elemental sulfur was heated with agitation to 280° F. To this mixture was slowly added a slurry consisting of 400 parts by weight of an alkyl phenol having a hydroxyl number of 160 and 48 parts by weight of calcium hydroxide. This whole mixture was heated at 300° F. for 1½ hours, after which the pressure was gradually reduced to 40 mm. of mercury and the temperature raised to 360° F. to remove the ethylene glycol. When approximately ⅔ of the ethylene glycol had been removed, 257 parts by weight of a mineral lubricating oil were added. The final ⅓ of ethylene glycol was then removed by heating to 360° F. at an absolute pressure of 40 mm. of mercury. After filtering the mixture, the resulting lubricating oil solution contained 3.48% calcium and 1.97% sulfur, representing a 60% lubricating oil solution of sulfurized normal calcium alkyl phenate.

*Example VII*

A mixture of 600 parts by weight of an alkyl phenol having a hydroxyl number of 160 and 31 grams of sulfur was heated to 300° F. To this mixture was added a slurry of 65 parts by weight of calcium hydroxide and 200 parts by weight of ethylene glycol, maintaining the temperature at 300° F. The absolute pressure of the reaction vessel was reduced to 40 mm. of mercury. The temperature was gradually raised to 360° F., during which time about ⅔ of the ethylene glycol was removed. When about ⅔ of the ethylene glycol had been removed by distillation, about 257 parts by weight of lubricating oil were added, and the remaining ⅓ of ethylene glycol was removed at a temperature of 360° F. and an absolute pressure of 40 mm. of mercury. After the reaction mixture had been filtered, the resulting lubricating oil solution contained 3.16% calcium and 2.28% sulfur.

*Example VIII*

A mixture of 300 parts by weight of an alkyl phenol having a hydroxyl number of 155, 40 parts by weight of calcium hydroxide, 19 parts by weight of sulfur, 50 parts by weight of ethylene glycol, and 200 parts by weight of a petroleum lubricating oil was slowly heated up to a temperature of 375° F. at an absolute pressure of 60 mm. of mercury. The temperature of 375° F. was maintained for 3 hours to remove all of the ethylene glycol; after which time the reaction mixture was filtered. The lubricating oil solution of normal sulfurized calcium alkyl phenate contained 3.83% calcium and 1.67% sulfur.

The following Example IX further illustrates the preparation of sulfurized calcium alkyl phenates according to the process of this invention.

*Example IX*

A mixture of 70 parts by weight of an alkyl phenol having a hydroxyl number of 168, 70 parts by weight of ethylene glycol and 6 parts by weight of calcium oxide was heated to 150° F. until all of the calcium oxide was dissolved. To this mixture was added 70 parts by weight of a light mineral lubricating oil and 4 parts by weight of sulfur. The temperature was slightly raised to 400° F. at a slightly reduced pressure. After all of the ethylene glycol had been removed the temperature of the reaction mixture was kept at 350° F. for approximately 30 minutes. After filtration, the reaction mixture contained 4.10% calcium and 2.08% sulfur.

We claim:

1. A method of stably incorporating sulfur and calcium into phenate materials to form highly oil-soluble sulfurized calcium phenates, which comprises bringing together into admixture: a phenol having up to 30 carbon atoms in any alkyl substituents on the ring, a calcium base selected from the group consisting of oxide and hydroxide and in an amount sufficient to form a sulfurized calcium alkyl phenate having a calcium metal-phenol mol ratio of at least 0.5, elemental sulfur in an amount of 10–200 mol per cent based on calcium, and a glycol containing less than 6 carbon atoms, the ratio of said glycol to calcium base being from 1 to about 50, and heating the mixture sufficiently to produce a sulfurized calcium alkyl phenate and to remove said glycol.

2. A method of stably incorporating sulfur and calcium into phenate materials to form highly oil-soluble sulfurized calcium phenates, which comprises bringing together into admixture: an alkyl phenol containing at least one alkyl radical of 4 to 30 carbon atoms, a calcium base selected from the group consisting of oxide and hydroxide and in an amount sufficient to form a sulfurized calcium alkyl phenate having a calcium metal-phenol mol ratio of at least 0.5, elemental sulfur in an amount of 10–200 mol per cent based on calcium, and a glycol containing less than 6 carbon atoms, the ratio of said glycol to calcium base being from 1 to about 50, then heating under conditions of temperature and pressure to remove water of reaction, and thereafter by distillation removing said glycol.

3. The process of claim 2 wherein the temperature is maintained below 400° F.

4. The process of claim 3 wherein the removal of water is at an absolute pressure substantially less than atmospheric.

5. A method of stably incorporating sulfur and calcium into phenate materials to form highly oil-soluble calcium phenates, which comprises bringing together into admixture: an alkyl phenol containing at least one alkyl radical of 4 to 30 carbon atoms, a calcium base selected from the group consisting of oxide and hydroxide and in an amount sufficient to form a sulfurized calcium phenate having a calcium metal-phenol mol ratio of at least 0.5, elemental sulfur in an amount of 10–200 mol per cent based on calcium and ethylene glycol in a ratio to said calcium base of from one to about 50, reducing the pressure on the resulting reaction mixture to an absolute pressure ranging from 350–450 mm. of mercury, slowly heating the reaction mixture to a temperature ranging from 240–300° F. for a time sufficient to remove the water of reaction, reducing the pressure to an absolute pressure of less than 150 mm. of mercury, slowly heating the reaction mixture to a temperature ranging from 325–400° F. for a time sufficient to remove more than 50% of the ethylene glycol by distillation, adding a lubricating oil as a diluent, heating the resulting mixture to an absolute pressure less than 150 mm. of mercury at a temperature ranging from 325–400° F. until the remaining ethylene glycol has been substantially removed by distillation, and filtering the remaining reaction mixture.

6. A method for stably incorporating sulfur and calcium into phenate materials to form highly oil-soluble sulfurized calcium phenates, which comprises intermixing: (1) a phenate material selected from the group consisting of phenols having up to 30 carbon atoms in any alkyl substituents on the ring and normal calcium salts of said phenols, (2) a calcium base selected from the group consisting of oxide and hydroxide and in an amount at least sufficient to form a sulfurized calcium alkyl phenate having a calcium metal-phenol mol ratio of at least 0.5 and up to 110 mol per cent in excess over the calcium present in normal calcium phenate, (3) elemental sulfur in an amount of 10–200 mol per cent based on calcium, and (4) a glycol containing less than 6 carbon atoms, the ratio of said glycol to calcium base being from one to about 50, and heating the resulting mixture at a temperature less than 400° F. and at an absolute pressure substantially less than atmospheric for a time sufficient to produce a sulfurized calcium alkyl phenate and to remove said glycol.

References Cited in the file of this patent

UNITED STATES PATENTS

| Number | Name | Date |
|---|---|---|
| 2,406,564 | Rogers et al. | Aug. 27, 1946 |
| 2,409,687 | Rogers et al. | Oct. 22, 1946 |